(12) United States Patent
Huang et al.

(10) Patent No.: US 8,248,705 B2
(45) Date of Patent: Aug. 21, 2012

(54) ZOOM LENS SYSTEM HAVING HIGH ZOOM RATIO AND SHORT OVERALL LENGTH

(75) Inventors: Hai-Jo Huang, Taipei Hsien (TW);
Fang-Ying Peng, Taipei Hsien (TW);
Sheng-An Wang, Taipei Hsien (TW);
Xiao-Na Liu, Guangdong (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 38 days.

(21) Appl. No.: 12/975,293

(22) Filed: Dec. 21, 2010

(65) Prior Publication Data

US 2012/0105975 A1    May 3, 2012

(30) Foreign Application Priority Data

Oct. 28, 2010  (CN) .......................... 2010 1 0523453

(51) Int. Cl.
*G02B 15/14* (2006.01)
(52) U.S. Cl. ...................................................... 359/687
(58) Field of Classification Search .................. 359/687, 359/683, 676
See application file for complete search history.

(56) References Cited

U.S. PATENT DOCUMENTS 7,558,001 B2    7/2009  Kim et al.
2009/0296230 A1*  12/2009  Sakai ........................... 359/684

FOREIGN PATENT DOCUMENTS

CN           101144900 A     3/2008
* cited by examiner

*Primary Examiner* — Scott J Sugarman
(74) *Attorney, Agent, or Firm* — Altis Law Group, Inc.

(57) ABSTRACT

A zoom lens system includes, in order from the subject side to the image side thereof, a first lens group of positive refractive power, a second lends group of negative refractive power, a third lens group of positive refractive power, and a fourth lens group of positive refractive power. The zoom lens system satisfies the following formulas: $-0.15 < L3/Lt < -0.35$, wherein, L3 is the movement vector of the third lens group during the zoom lens system moves from the wide-angle state to the telephoto state. The movement vector is a positive value when the third lens group moves from the object side to the image side. The movement vector is a negative value when the third lens group moves from the image side to the object side. Lt is the total length of the zoom lens system along the optical axis when in the telephoto state.

10 Claims, 7 Drawing Sheets

ZOOM LENS SYSTEM HAVING HIGH ZOOM RATIO AND SHORT OVERALL LENGTH

BACKGROUND

1. Technical Field

The present disclosure relates to lens systems and, particularly, to a zoom lens system having a short overall length and a high zoom ratio.

2. Description of Related Art

In order to obtain small-sized camera modules for use in thin devices, such as mobile phones, personal digital assistant (PDA), or webcams that can still capture quality images, zoom lens systems with high zoom ratio but short overall length are desired. Factors affecting both the zoom ratio and the overall length of the zoom lens system, such as, the number and state of lenses employed, the power distribution of the employed lenses, and the shape of each employed lens, complicates any attempts at increasing zoom ratios but shortening overall lengths of zoom lens systems. For example, reducing the number of lenses can shorten the overall length of the zoom lens system, but zoom ratio will suffer, conversely, increasing the number of lenses can increase zoom ratio, but increases overall length of the zoom lens system.

Therefore, it is desirable to provide a zoom lens system which can overcome the limitations described.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Embodiments of the present disclosure will now be described in detail with reference to the drawings.

Figure 1:
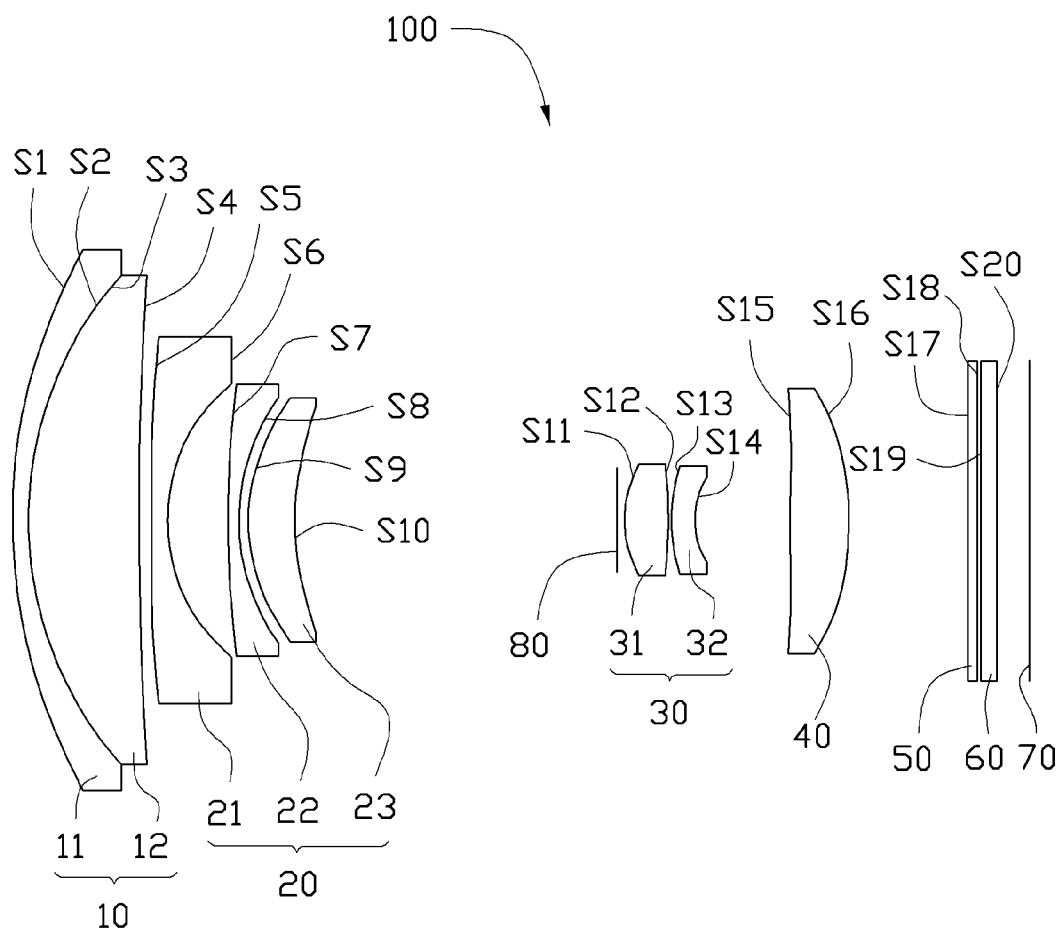
FIG. 1 is a schematic view of a zoom lens system in one embodiment.

Referring to FIG. 1, a zoom lens system 100 includes, in order from the subject side to the image side thereof, a first lens group 10 of positive refractive power, a second lens group 20 of negative refractive power, a third lens group 30 of positive refractive power, a fourth lens group 40 of positive refractive power, an infrared cut filter 50, a protective glass 60, and an image plane 70. The first, second, third, and fourth lens groups 10, 20, 30, 40 are capable of moving along the optical axis of the zoom lens system 100.

When capturing an image, incident light rays enter the zoom lens system 100, transmit through the four lens groups 10-40, the infrared cut filter 50, the protective glass 60, and reach the image plane 70.

The first lens group 10 includes, in order from the subject side to the image side of the zoom lens system 100, a first lens 11 of negative refractive power and a second lens 12 of positive refractive power. The first lens 11 has a first subject-side surface S1 facing the subject side of the zoom lens system 100 and a first image-side surface S2 facing the image side of the zoom lens system 100. The second lens 12 has a second subject-side surface S3 facing the subject side of the zoom lens system 100 and a second image-side surface S4 facing the image side of the zoom lens system 100. The first image-side surface S2 and the second subject-side surface S3 are adhered together to form a single surface.

The second lens group 20 includes, in order from the subject side to the image side of the zoom lens system 100, a third lens 21 of negative refractive power, a fourth lens 22 of negative refractive power, and a fifth lens 23 of positive refractive power. The third lens 21 has a third subject-side surface S5 facing the subject side of the zoom lens system 100 and a third image-side surface S6 facing the image side of the zoom lens system 100. The fourth lens 22 has a fourth subject-side surface S7 facing the subject side of the zoom lens system 100 and a fourth image-side surface S8 facing the image side of the zoom lens system 100. The fifth lens 23 has a fifth subject-side surface S9 facing the subject side of the zoom lens system 100 and a fifth image-side surface S10 facing the image side of the zoom lens system 100.

The third lens group 30 includes, in order from the subject side to the image side of the zoom lens system 100, a sixth lens 31 of positive refractive power and a seventh lens 32 of negative refractive power. The sixth lens 31 has a sixth subject-side surface S11 facing the subject side of the zoom lens system 100 and a sixth image-side surface S12 facing the image side of the zoom lens system 100. The seven lens has a seventh subject-side surface S13 facing the subject side of the zoom lens system 100 and a seventh image-side surface S14 facing the image side of the zoom lens system 100.

The fourth lens group 40 includes an eighth lens of positive refractive power. The eighth lens has an eighth subject-side surface S15 facing the subject side of the zoom lens system 100 and an eighth image-side surface S16 facing the image side of the zoom lens system 100.

The infrared cut filter 50 is used for filtering out infrared light to increase quality of the image and includes a ninth subject-side surface S17 facing the subject side of the zoom lens system 100 and a ninth image-side surface S18 facing the image side of the zoom lens system 100.

The protective glass 60 is used for protecting the image plane 70 and includes a tenth subject-side surface S19 facing the subject side of the zoom lens system 100 and a tenth image-side surface S20 facing the image side of the zoom lens system 100.

In practice, an aperture stop 80 can be interposed between the second lens group 20 and the third lens group 30 to limit the flux of light from the second lens group 20 to the third lens group 30, and thus the light cone of the light rays entering the third lens group 30 will be more symmetrical to control the coma occurring in the zoom lens system 100 within a correctable range.

The zoom lens system 100 satisfies the formula (1) $-0.35 < L3/Lt < -0.15$, where L3 is a movement vector of the third lens group 30 corresponding to that the zoom lens system 100 moves from the wide angle state to the telephoto state. The movement vector of the third lens group 30 is a positive value when the third lens group 30 moves from the object side to the image side. The movement vector of the third lens group 30 is a negative value when the third lens group 30 moves from the image side to the object side, Lt is the total length of the zoom lens system 100 along the optical axis thereof in the telephoto state. Specifically, when $L3/Lt < -0.15$ is not satisfied, coma occurring in the zoom lens system 100 exceeds the correctable range, when $-0.35 < L3/Lt$ is not satisfied, the second lens group 20 and the third lens group 30 will have a risk of collision. In this embodiment, L3=−10.43 mm, Lt=49 mm, L3/Lt=−0.213.

To optimize optical performance, the zoom lens system 100 further satisfies the formula: (2) 0.165<f3/ft<0.3, where f3 is the effective focal length of the third lens group 30, ft is the effective focal length of the zoom lens system 100 in the telephoto state. Specifically, when f3/ft<0.3 is not satisfied, coma occurring in the zoom lens system 100 exceeds the correctable range, when 0.165<f3/ft is not satisfied, the third lens group 30 and the fourth lens group 40 will have a risk of collision. In this embodiment, f3=7.99 mm, ft=36.33 mm, f3/ft=0.22.

To reduce the thickness of the zoom lens system 100, the zoom lens system 100 further satisfies the formula: (3) 1.3< (T1+T2+T3+T4)/DIM<1.9, where T1 is the overall length of the first lens group 10, T2 is the overall length of the second lens group 20, T3 is the overall length of the third lens group 30, T4 is the overall length of the fourth lens group 40, DIM is a diameter of a maximum imaging circle of the zoom lens system 100. In this embodiment, T1=3.97 mm, T2=4.495 mm, T3=2.184 mm, T4=1.81 mm, DIM=7.79 mm, (T1+T2+T3+T4)/DIM=1.599.

The lenses 11, 12, 21, 22, 23, 31, 32, and the eight lens all have two aspherical surfaces (that is, a aspherical subject-side surface and an aspherical image-side surface) to efficiently correct aberrations occurring therein. The aspherical surfaces are shaped according to the formula:

$$x = \frac{ch^2}{1+\sqrt{1-(k+1)c^2h^2}} + \sum A_i h^i,$$

where h is a height from the optical axis of the lens system 100 to the aspherical surface, c is a vertex curvature, k is a conic constant, and Ai are i-th order correction coefficients of the aspheric surface.

In the embodiments, the following symbols are used:
F/No: F number;
2ω: field angle;
R: radius of curvature;
D: distance between surfaces on the optical axis of the lens system 100;
Nd: refractive index of lens of d light (wavelength: 587.6 nm); and
Vd: Abbe number of d light (wavelength: 587.6 nm).

The zoom lens system 100 of the first embodiment satisfies the tables 1-3.

TABLE 1

| Surface | R (mm) | D (mm) | Nd | Vd |
|---|---|---|---|---|
| S1 | 17.509 | 0.5 | 2 | 25.5 |
| S2(S3) | 12.333 | 3.47 | 1.73 | 54.7 |
| S4 | 97.544 | D3 | — | — |
| S5 | −77.394 | 0.53 | 1.81 | 40.7 |
| S6 | 7.247 | 1.865 | — | — |
| S7 | 210.044 | 0.35 | 1.75 | 52.3 |
| S8 | 6.902 | 0.3 | — | — |
| S9 | 5.417 | 1.45 | 2 | 19.3 |
| S10 | 8.555 | D9 | — | — |
| Aperture stop 80 | infinity | 0.25 | — | — |
| S11 | 3.578 | 1.36 | 1.62 | 58.2 |
| S12 | −8.933 | 0.1 | — | — |
| S13 | 7.198 | 0.724 | 1.75 | 25 |
| S14 | 2.691 | D14 | — | — |
| S15 | 110.685 | 1.81 | 1.5 | 81.6 |
| S16 | −10.818 | D16 | — | — |
| S17 | infinity | 0.3 | 1.52 | 64.2 |

TABLE 1-continued

| Surface | R (mm) | D (mm) | Nd | Vd |
|---|---|---|---|---|
| S18 | infinity | 0.1 | — | — |
| S19 | infinity | 0.5 | 1.52 | 64.2 |
| S20 | infinity | 1 | — | — |
| Image plane 70 | infinity | — | — | — |

TABLE 2

| Surface | Aspherical coefficient |
|---|---|
| S4 | K = 0; A4 = 7.285928e−04; A6 = −1.02141e−05; A8 = −2.21533e−07; A10 = 3.234887e−10; A12 = 1.403337e−10; A14 = 4.380274e−12; A16 = −1.14372e−13 |
| S5 | K = 0; A4 = 8.333347e−04; A6 = 3.836097e−05; A8 = −2.356593e−06; A10 = 4.713518e−08; A12 = 3.023523e−09; A14 = −1.106193e−10; A16 = −3.618037e−12 |
| S8 | K = 0; A4 = −8.53161e−04; A6 = −1.938697e−05; A8 = −3.409221E−06; A10 = 1.793909E−07; A12 = 1.201957E−08; A14 = 4.504156E−10; A16 = −7.4584e−11 |
| S9 | K = 0; A4 = −6.756763e−04; A6 = −1.042164e−05; A8 = −2.072401e−06; A10 = 2.040714e−07; A12 = 1.277144e−08; A14 = 9.482202e−10; A16 = −1.20145e−10 |
| S11 | K = −0.569381; A4 = −3.709367e−03; A6 = 5.953039e−04; A8 = −5.851837e−04; A10 = 1.157918e−04; A12 = −1.466671e−05; A14 = 1.021669e−06; A16 = −3.479846e−07 |
| S12 | K = 0; A4 = −1.079932e−03; A6 = 2.975613e−04; A8 = −6.252417e−04; A10 = 1.479121e−04; A12 = 1.062412e−05; A14 = −1.57746e−05; A16 = 2.320427e−06 |
| S15 | K = 0; A4 = −7.499888e−04; A6 = −1.244596e−05; A8 = 4.095156e−06; A10 = −5.15029e−07; A12 = 1.032745e−08; A14 = 6.692326e−10; A16 = −3.855609e−11 |
| S16 | K = 0; A4 = −7.375438e−04; A6 = −6.933953e−05; A8 = 1.055911e−05; A10 = −7.442485e−07; A12 = 8.975996e−09; A14 = 8.183427e−10; A16 = −3.043076e−11 |

TABLE 3

|  | D3 | D9 | D14 | D16 |
|---|---|---|---|---|
| Wide-angle state | 0.4 | 10.1 | 3.01 | 3.82 |
| Telephoto state | 16.16 | 0.97 | 13.59 | 3.67 |

TABLE 4

|  | ft (mm) | F/No | 2ω |
|---|---|---|---|
| Wide-angle state | 4.82 | 3.36 | 78 |
| Telephoto state | 36.33 | 6.07 | 12.5 |

Figure 2:
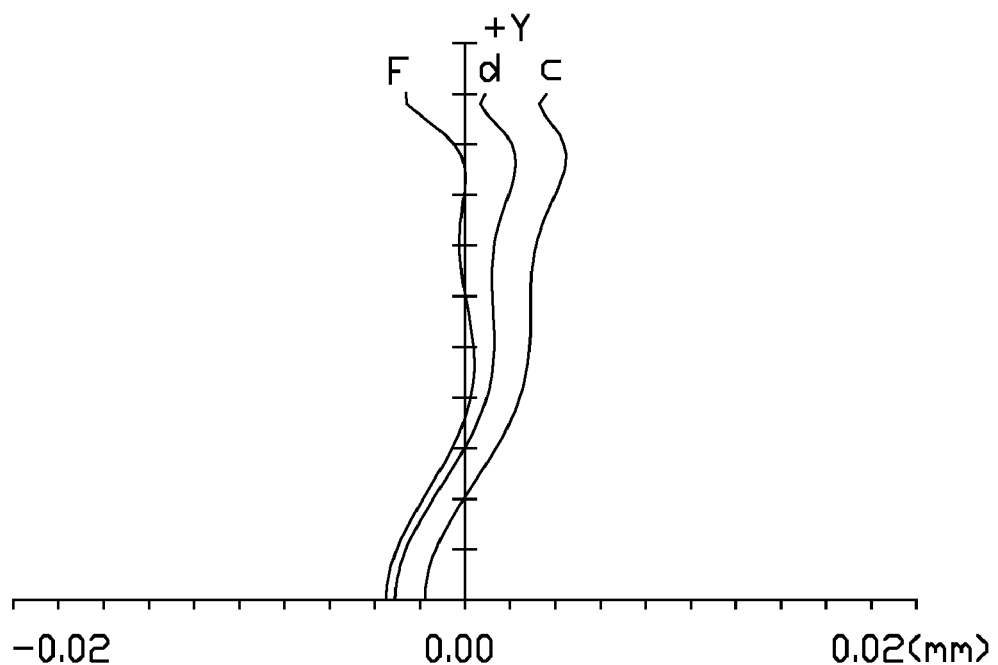
FIGS. 2-4 are graphs respectively showing spherical aberration, field curvature, and distortion in the zoom lens system of FIG. 1 in a wide angle state.
Figure 3:
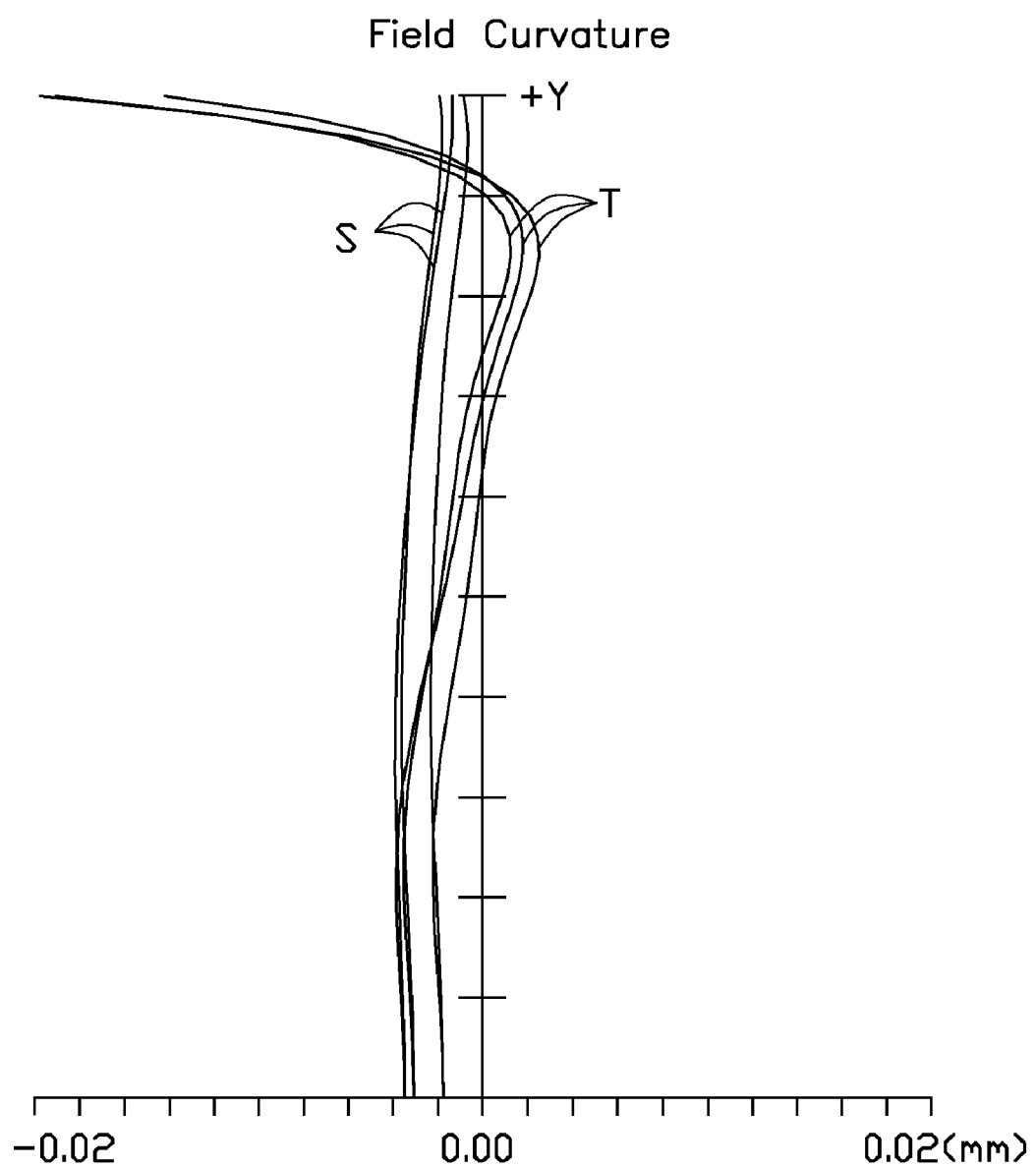
Figure 4:
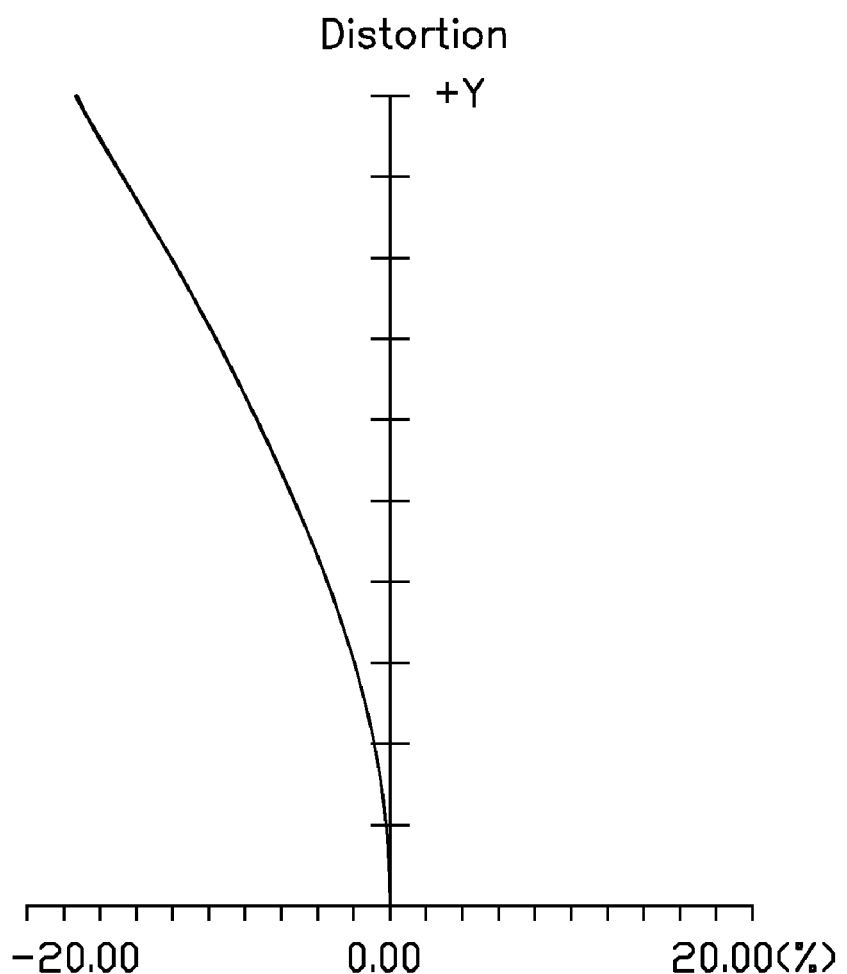

As illustrated in FIG. 2, the curves F, d, and C are respective spherical aberration characteristic curves of F light (wavelength: 486.1 nm), d light (wavelength: 587.6 nm), and C light (wavelength: 656.3 nm) occurring in the zoom lens system 100 of wide-angle state. Obviously, spherical aberration of visible light (400-700 nm) occurring in the zoom lens system 100 of wide-angle state is in a range of: −0.02 mm~0.02 mm. In FIG. 3, the curves T and S are the tangential field curvature curve and the sagittal field curvature curve when the lens system 100 is in wide-angle state, respectively. Clearly, field curvature occurring in the lens system 100 of wide-angle state is limited to a range of: −0.02 mm~0.02 mm. In FIG. 4, distortion occurring in the lens system 100 of wide-angle state is limited within the range of: −20%~20%.

Figure 5:
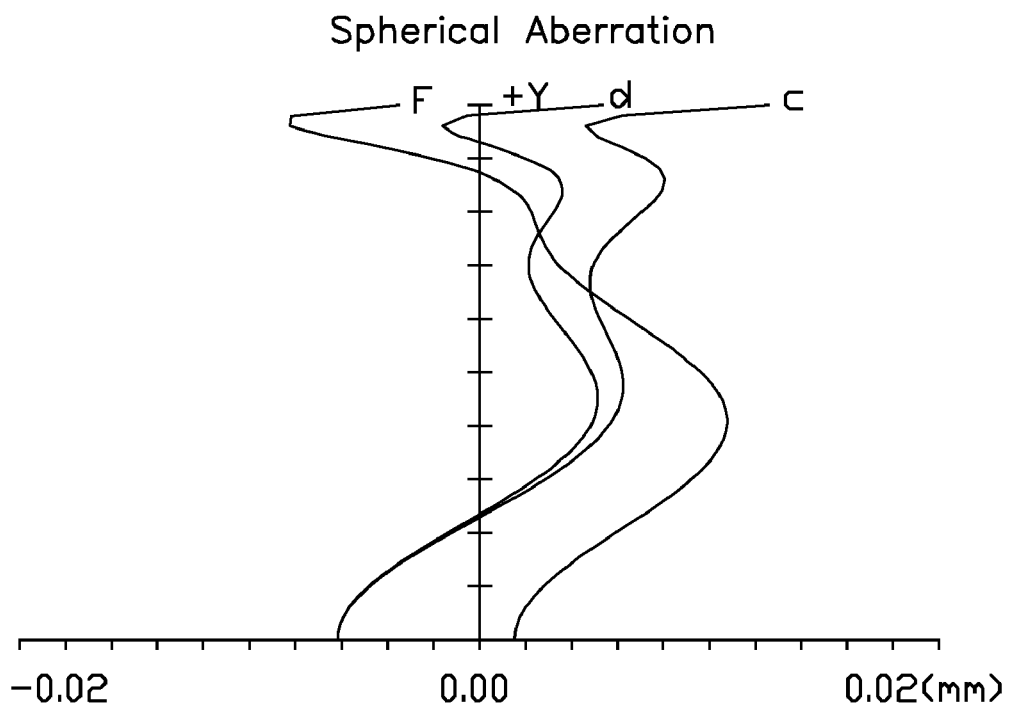
FIGS. 5-7 are graphs respectively showing spherical aberration, field curvature, and distortion occurring in the zoom lens system of FIG. 1 in a telephoto state.
Figure 6:
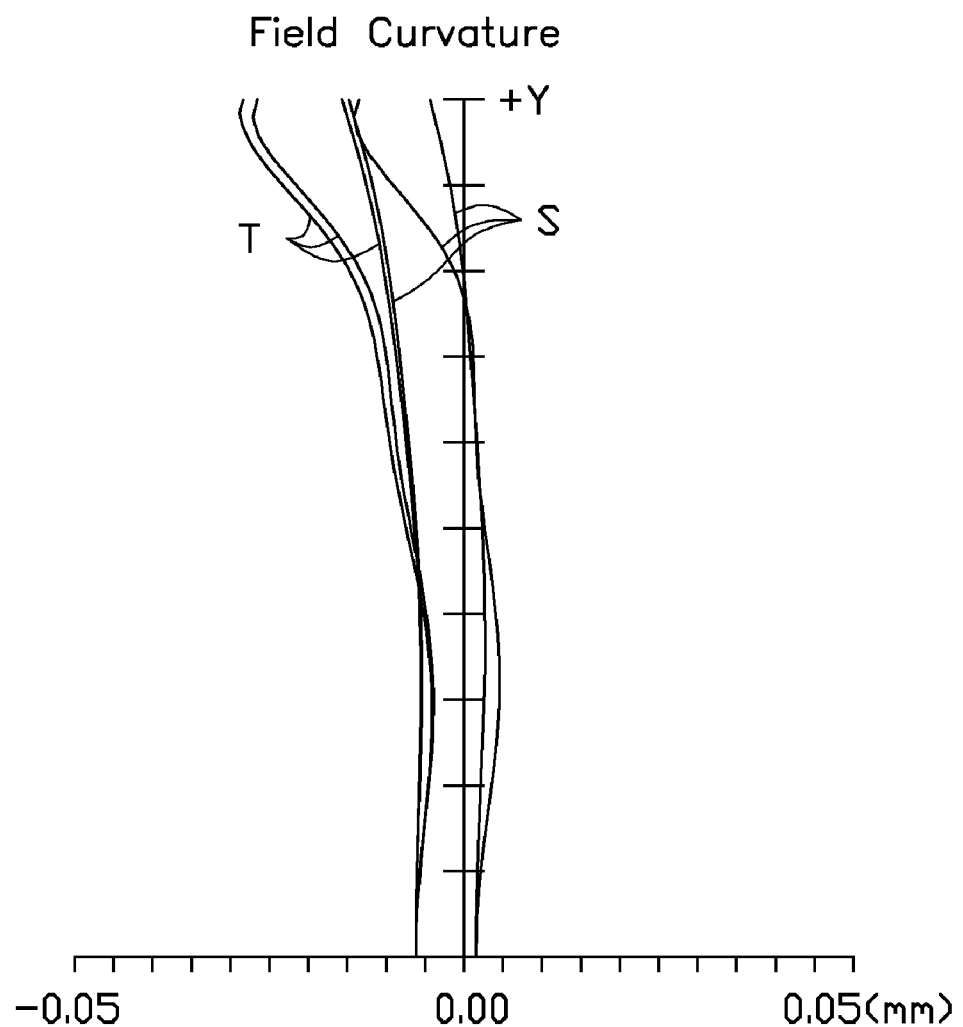
Figure 7:
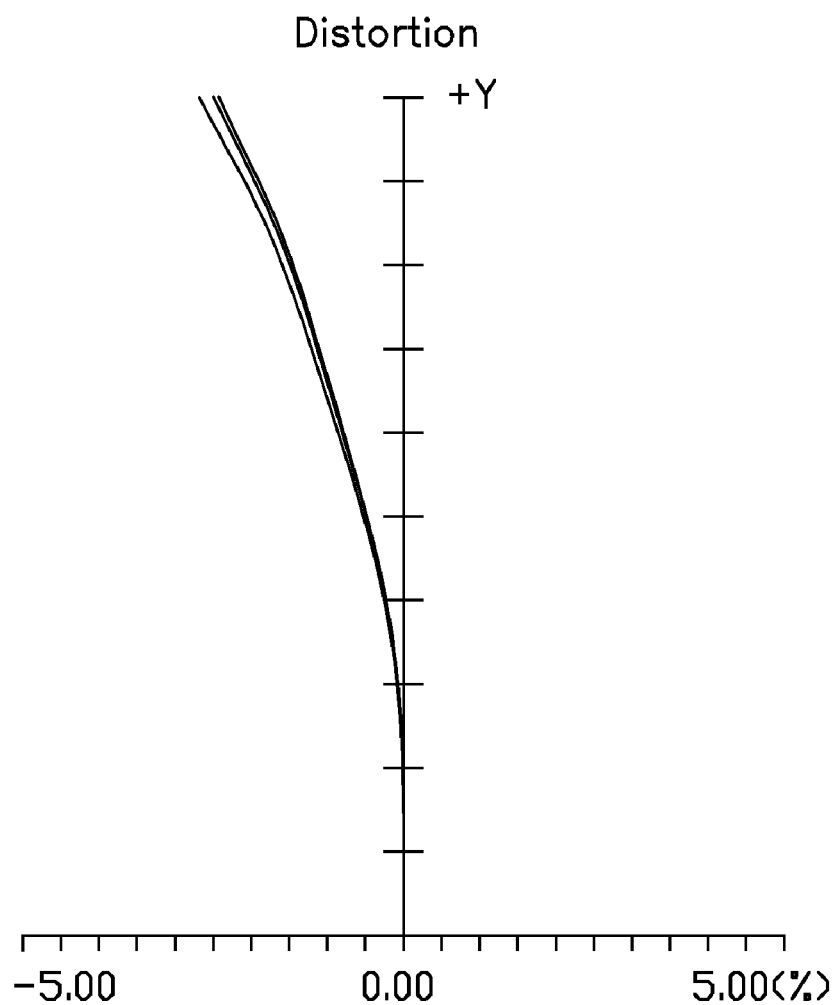

As illustrated in FIG. 5, the curves F, d, and C are respective spherical aberration characteristic curves of F light (wavelength: 486.1 nm), d light (wavelength: 587.6 nm), and C light (wavelength: 656.3 nm) occurring in the zoom lens system 100 of telephoto state. Obviously, spherical aberration of visible light (400-700 nm) occurring in the zoom lens system 100 of telephoto state is in a range of: −0.02 mm~0.02 mm. In FIG. 6, the curves T and S are the tangential field curvature curve and the sagittal field curvature curve when the zoom lens system 100 is in telephoto state, respectively. Clearly, field curvature occurring in the zoom lens system 100 of telephoto state is limited to a range of: −0.05 mm~0.05 mm. In FIG. 7, distortion occurring in the zoom lens system 100 of telephoto state is limited within the range of: −5%~5%.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:

1. A zoom lens system, in order from the subject side to the image side thereof, comprising:
    a first lens of positive refractive power;
    a second lens of negative refractive power;
    a third lens of positive refractive power; and
    a fourth lens of positive refractive power;
    wherein the first, second, third, and fourth lens groups are capable of moving along the optical axis of the zoom lens system;
    wherein the zoom lens system satisfies the following formula: −0.35<L3/Lt<−0.15; where L3 is the movement vector of the third lens group during the zoom lens system moves from the wide-angle state to the telephoto state, the movement vector of the third lens group is a positive value when the third lens group moves from the object side to the image side, the movement vector of the third lens group is a negative value when the third lens group moves from the image side to the object side, Lt is the total length of the zoom lens system along the optical axis in the telephoto state;
    wherein the zoom lens system satisfies the following formula: 1.3<(T1+T2+T3+T4)/DIM<1.9, where T1 is the overall length of the first lens group, T2 is the overall length of the second lens group, T3 is the overall length of the third lens group, T4 is the overall length of the fourth lens group, DIM is a diameter of a maximum imaging circle of the zoom lens system.

2. The zoom lens system of claim 1, further satisfying the following formula: 0.165<f3/ft<0.3, where f3 is the effective focal length of the third lens group, ft is the effective focal length of the zoom lens system in the telephoto state.

3. The zoom lens system of claim 1, wherein the first lens group, in order from the subject side to the image side of the zoom lens system, comprises a first lens of negative refractive power and a second lens of positive refractive power.

4. The zoom lens system of claim 1, wherein the second lens group, in order from the subject side to the image side of the zoom lens system, comprises a third lens of negative refractive power, a fourth lens of negative refractive power, and a fifth lens of positive refractive power.

5. The zoom lens system of claim 1, wherein the third lens group, in order from the subject side to the image side of the zoom lens system, comprises a sixth lens of positive refractive power and a seventh lens of negative refractive power.

6. The zoom lens system of claim 1, wherein the fourth lens group comprises an eighth lens of positive refractive power.

7. The zoom lens system of claim 1, wherein the zoom lens system further comprises an image plane positioned on the image side of the fourth lens group.

8. The zoom lens system of claim 7, wherein the zoom lens system further comprises an infrared cut filter disposed between the fourth lens group and the image plane.

9. The zoom lens system of claim 8, wherein the zoom lens system further comprises a protective glass positioned between the infrared cut filter and the image plane.

10. The zoom lens system of claim 1, wherein the zoom lens system further comprises an aperture stop positioned between the second lens group and the third lens group.

* * * * *